United States Patent [19]

Mackechnie et al.

[11] Patent Number: 5,710,786
[45] Date of Patent: Jan. 20, 1998

[54] OPTICAL FIBRE LASER PUMP SOURCE FOR FIBRE AMPLIFIERS

[75] Inventors: Colin J. Mackechnie; Brian F. Ventrudo; Peter G. Berrang, all of Victoria, Canada

[73] Assignee: SDL, Inc., San Jose, Calif.

[21] Appl. No.: 519,369

[22] Filed: Aug. 25, 1995

[51] Int. Cl.[6] .................................................. H01S 3/30
[52] U.S. Cl. ......................... 372/6; 372/19; 372/102
[58] Field of Search ............................. 372/6, 92, 69, 372/102, 41, 19

[56] References Cited

U.S. PATENT DOCUMENTS

| | | | |
|---|---|---|---|
| 5,309,452 | 5/1994 | Ohishi et al. | 372/6 |
| 5,473,622 | 12/1995 | Grubb | 372/39 |
| 5,485,481 | 1/1996 | Ventrudo et al. | 372/6 |
| 5,511,093 | 4/1996 | D'Amato et al. | 372/6 |
| 5,561,675 | 10/1996 | Bayon et al. | 372/6 |
| 5,594,747 | 1/1997 | Ball | 372/102 |

OTHER PUBLICATIONS

Pask et al:"Operation of cladding-pumped Yb+3-doped silica fiber lasers in 1 mregion";Electroninc Letters,vol.30, No. 11,@6 May,1994.

"High Power Neodymium-Doped Single Transverse Mode Fibre Laser" by H.Po, J.D. Cao, B.M. Laliberte, R.A. Minns, R.F. Robinson, B.H. Rockney, R.R. Tricca and Y.H. Zhang, Electronics Letters, 19th Aug. 1993, vol. 29, No. 17, pp. 1500–1501.

"Nd[3] Fibre Laser Utilising Intra-Core Bragg Reflectors" by G.A. Ball, W.W. Morey and J.P. Waters, United Technologies Research Center, East Hartford, Connecticut 06108, U.S.A., Aug. 31, 1990.

"Operation of Cladding-Pumped Yb$^{3+}$-Doped Silica Fibre Lasers in 1μm Region" by H.M. Pask, J.L. Archambault, D.C. Hanna, L. Reekie, P.St.J. Russell, J.E. Townsend and A.C. Tropper, Electronics Letters, 26th May 1994, vol. 30, No. 11.

"Ytterbium-Doped Silica Fibre Laser With Intracore Bragg Gratings Operating at 1·02 μm" by J.Y. Allain, J.F. Bayon, M. Monerie, P. Bernage and P. Niay, Electronics Letters, 4th Feb. 1993, vol. 29, No. 3.

"High Power Double-Clad Fiber Lasers" by Luis Zenteno, Journal of Lightwave Technology, vol. II, No. 9, Sep. 1993, pp. 1435–1446.

"Propagation in Doubly Clad Single-Mode Fibers" by Michel Monerie, IEEE Journal of Quantum Electronics, vol. QE-18, No. 4, Apr. 1982, pp. 535–542.

*Primary Examiner*—Leon Scott, Jr.
*Attorney, Agent, or Firm*—W. Douglas Carothers, Jr.

[57] ABSTRACT

Apparatus for generating laser light having a wavelength in the range of about 1012 to 1022 nm comprising a double clad optical fiber having a core doped with triply ionised ytterbium ions, a source of laser light emitting at a wavelength of about 800 to 1070 nm and coupled to launch the light into the fiber, and fiber Bragg gratings written into the core region of the optical fiber so as to provide optical discrimination of the emission centered in the range of about 1012 to 1022 nm.

3 Claims, 2 Drawing Sheets

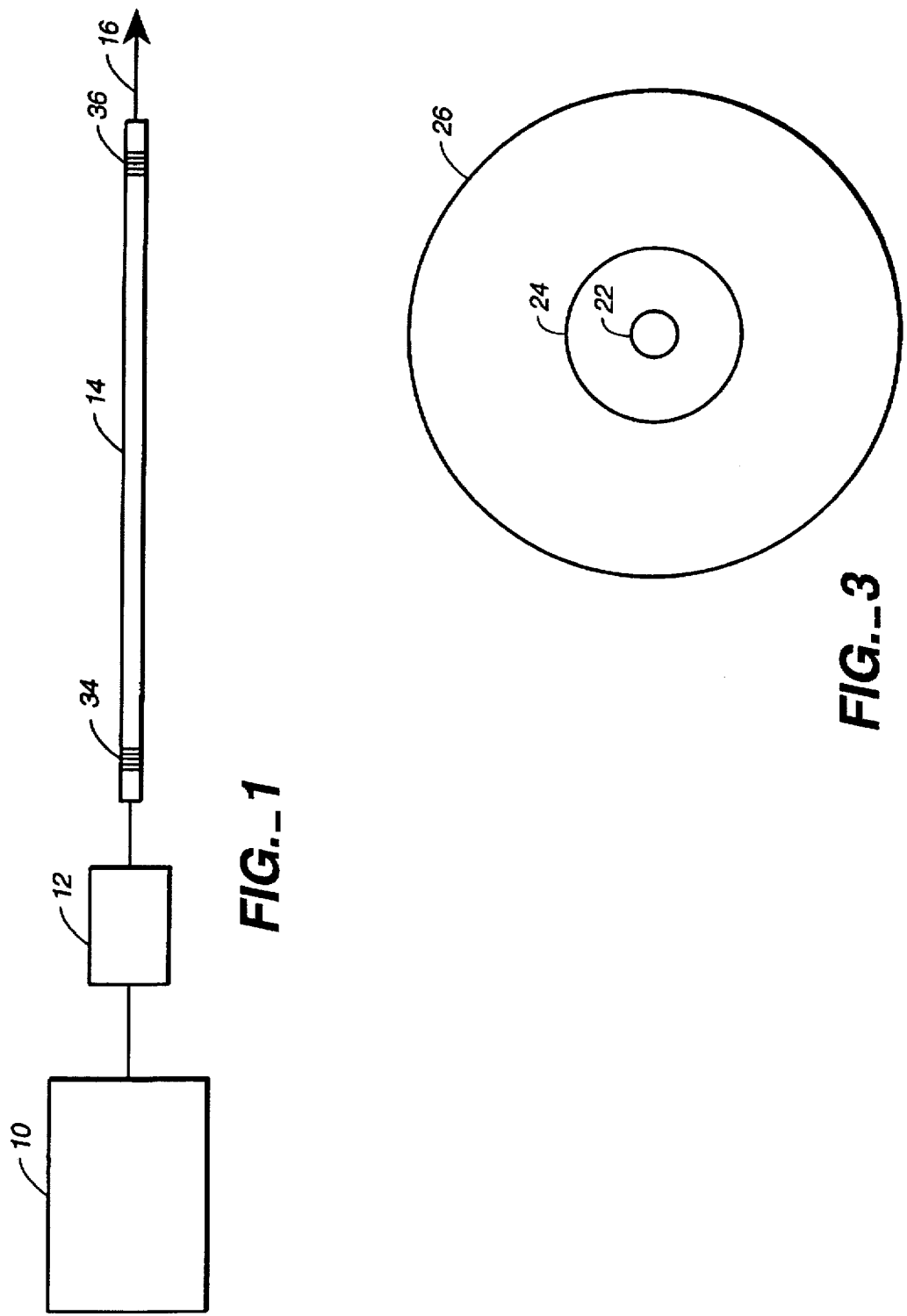

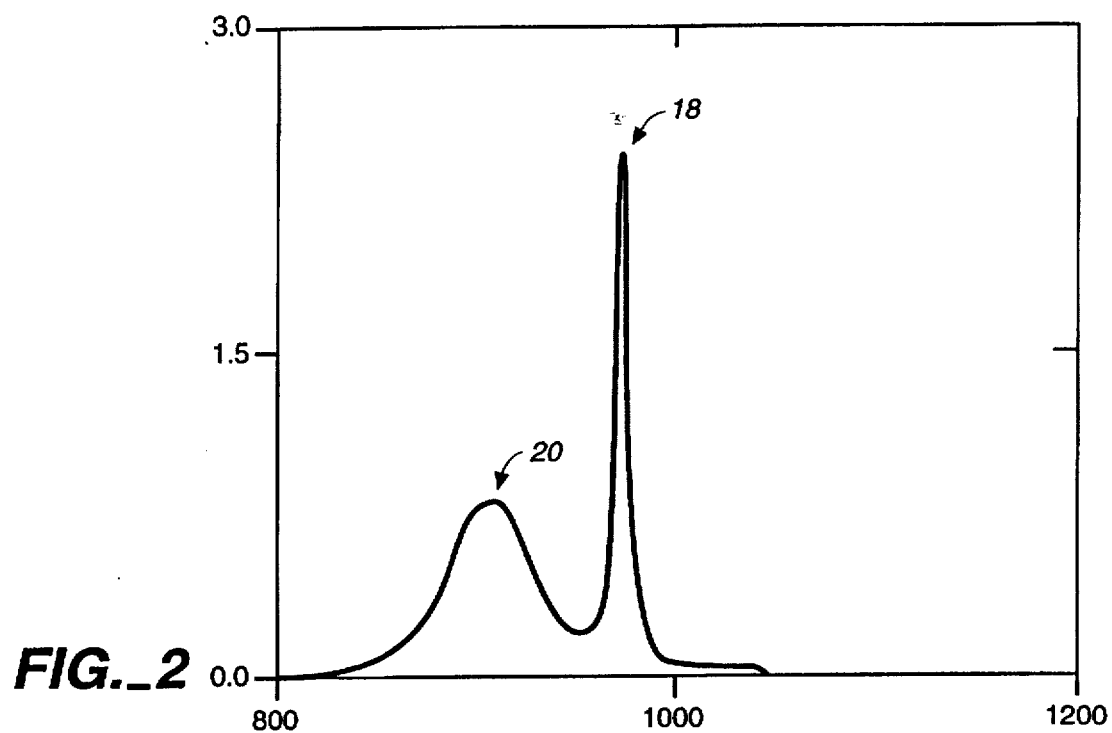
FIG._2
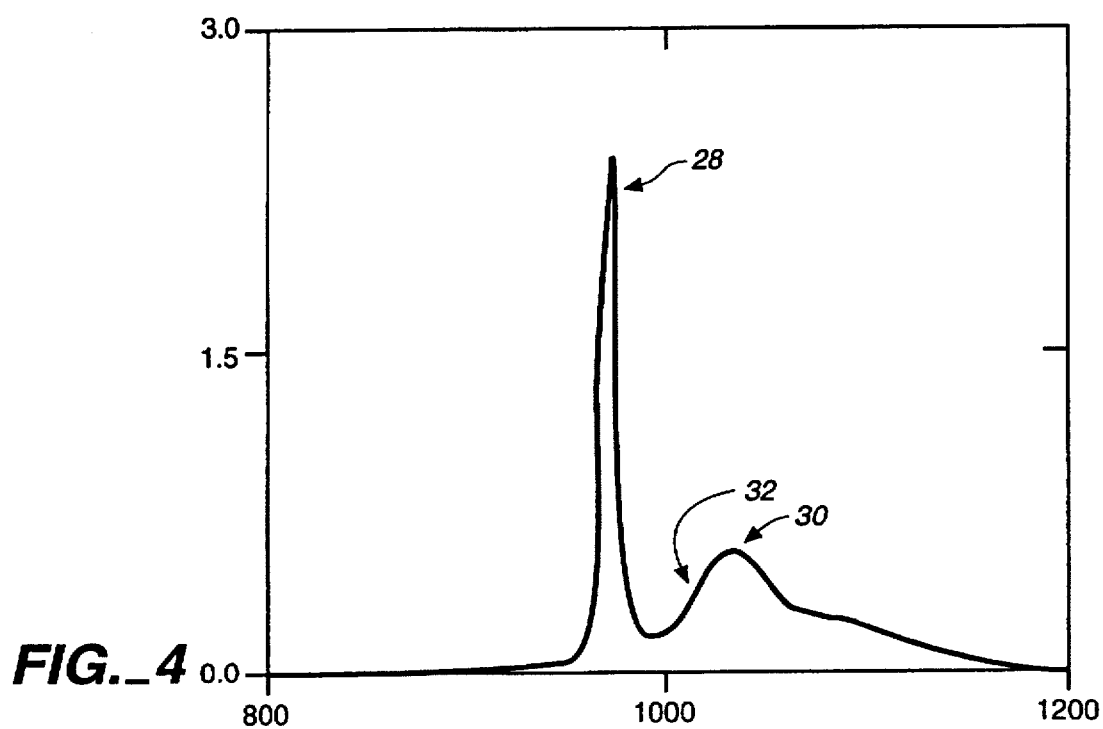
FIG._4

OPTICAL FIBRE LASER PUMP SOURCE FOR FIBRE AMPLIFIERS

FIELD OF THE INVENTION

The invention relates to an optical fibre laser source generating light having a wavelength of between 1010 and 1030 nm, corresponding to the peak of the $^3H_4 \rightarrow {}^1G_4$ absorption of triply ionised praseodymium in glass fibre.

BACKGROUND OF THE INVENTION

Fibre amplifiers and lasers have rapidly become important components of optical fibre communications systems. In particular optical fibre amplifiers are used to intensify optical signals that have been attenuated along the length of a fibre optic communication path. Optical communication systems usually operate in two separate specific wavelength regions, namely 1280 to 1340 nm and 1530 to 1565 nm, and different types of optical fibre amplifiers are required for each wavelength region. For the region of approximately 1550 nm, the basic optical amplifier consists of erbium in a trivalent state doped into a silica-based optical fibre. This amplifier is most conveniently pumped by a laser diode, which can have a number of different operating wavelengths although an operating wavelength of about 980 nm is preferred. But such a fibre amplifier is only suitable for amplification of signals in the 1530 to 1565 nm wavelength region. To achieve optical amplification in the 1280 to 1340 nm wavelength region, a different device is required. The device may be in the form of glass optical fibre, however erbium ions are not suitable and it is generally considered that the triply ionised rare-earth dopant should be either neodymium, dysprosium or praseodymium. In the case of triply ionised praseodymium in a host glass fibre based on heavy metal fluoride glasses, a pump source is required which matches an absorption of the praseodymium such that the ions can be excited into a state known as the $^1G_4$ level. This excited state is the upper state of the amplifier which is suitable for amplification of signals in the 1280 to 1340 nm range. The light required to accomplish the absorption from the ground state in triply ionised praseodymium doped in heavy metal fluoride glass must have a wavelength in the range 950 to 1070 nm with the maximum absorption occurring between 1012 and 1022 nm. The typical power required to pump such an amplifier at the maximum absorption is of the order of 300–500 mW.

A conventional approach to generating laser light between 1012 and 1022 nm is to generate it directly from a laser diode that emits light in a single spatial mode from an emitting region that is typically 1×3 micrometres. For the amplifier, it is required that the triply ionised praseodymium doped glass fibre can sustain only a single spatial mode at the signal wavelength, that is, the fibre has a circular core of diameter approximately four micrometres and that secondly the laser diode is of sufficiently high output laser power to cause efficient amplification. Given the present state of the art, a single mode laser diode typically emits a power of 100 mW but this is not powerful enough to act as a pump for the amplifier. Laser diodes exist that have much higher output power, but such devices emit light in a multitude of spatial modes. The present state of the art allows diodes that typically emit one to three watts of power from a single large rectangular emitting area, of the order of 100–200×1 micrometres. It is very difficult, therefore, to make an efficient amplifier for the 1280–1340 nm region with triply ionised praseodymium doped fluoride based optical fibre with one diode laser because the characteristics of the diode laser make it difficult to launch sufficient light efficiently into the single mode core of the optical fibre. It is possible to compensate for the low launch efficiency into the fibre by increasing the pump power by using an array of several laser diodes coupled together through an optical fibre coupler or to use complicated double pass pump methods, but it is very difficult, with the present state of the art to have an efficient single pass amplifier directly pumped with a single laser diode.

It is therefore an object of the present invention to provide improved apparatus for efficiently generating high laser powers at a wavelength corresponding to the peak of the $^3H_4 \rightarrow {}^1G_4$ absorption band of triply ionised praseodymium doped optical glass fibre.

SUMMARY OF THE INVENTION

The present invention comprises apparatus for generating laser light having a wavelength in the range of 1012 to 1022 nm comprising a double clad optical fibre having a core doped with triply ionised ytterbium ions, a source of laser light emitting at a wavelength of about 800 to 1070 nm and coupled to launch the light into the fibre, and fibre Bragg gratings written into the core region of the optical fibre so as to provide optical discrimination of the emission centered in the range of 1012 to 1022 nm.

The device consists of a resonating cavity providing suitable optical feedback only at the desired laser wavelength such that a suitable output power may be generated. The fibre Bragg gratings optically discriminate against other wavelengths which may be capable of lasing. Fibre Bragg gratings are a periodic structure of variations in the refractive index in or near the guided mode region of the fibre core that reflect light over a very narrow range of wavelength while transmitting light at other wavelengths.

The invention uses a silica-based glass optical fibre doped with triply ionised rare-earth ytterbium ions. Such a source, called a fibre laser, is pumped by a laser diode operating at a wavelength within the absorption band of the triply ionised ytterbium ions in glass, that is between 800 and 1070 nm. To achieve efficient launching of the laser output from the ytterbium doped fibre into the single mode triply ionised praseodymium doped optical fibre, the laser output from the fibre should also be single mode at the laser wavelength. However if sufficient power is to be generated by the triply ionised ytterbium doped fibre laser to pump a praseodymium amplifier, then the pump source for the triply ionised ytterbium doped fibre must be a multi-mode laser diode able to generate at least one watt of optical power at the laser diode wavelength. Given the present state of the art, such laser diodes are highly divergent sources from which it is difficult to launch into the single mode core of the ytterbium doped optical fibre. By using a double clad fibre, light from the laser diode is launched into an inner cladding and as it is guided along the inner cladding of the fibre, it is absorbed in the core which is doped with rare-earth ions. Some of the signal light generated from the rare-earth ions is guided in the core and a laser can operate with characteristics determined mainly by the core.

By using the dual-cladding fibre design, the pump light from the laser diode is efficiently launched into the multi-mode inner cladding and absorbed in the core and the laser light generated in the core has a single spatial mode which can in mm be efficiently launched into the core of the fibre of the amplifier. Thus the power limitations encountered when launching laser diode light into single mode optical fibre can be overcome.

The emission spectrum for triply ionised ytterbium doped in glass fibre is from about 800 to 1200 nm with peak emission occurring at about 974 nm and 1033 nm and elevated emission at the wavelength of interest, namely from 1012 to 1022 nm.

Fibre lasers with indiscriminate or broadband optical feedback operate at the peak of the gain of the triply ionised rare-earth ions doped in the optical fibre. However, the broadband reflection of ~4% (due to Fresnel reflections) from the cleaved, bare optical fibre ends provides indiscriminate feedback for all possible laser wavelengths emitted from the rare earth ion and cannot be used to cause a laser to operate at one particular wavelength as opposed to the wavelength at the peak gain of the laser medium. To operate as a laser at any of the other wavelengths that are emitted by the rare-earth ions, optical discrimination must be provided. This can be done by adjusting the wavelength dependence of the optical feedback of the laser resonator cavity. To achieve lasing at a particular wavelength rather than any other wavelength, including that of the peak gain, dielectric mirrors would typically be used in the prior art. The dielectric mirrors can be manufactured by vapour phase deposition, a process whereby layers of material (often $HfO_2$ and $SiO_2$) are deposited on a flat silica substrate and have a thickness of $\lambda/4$, where $\lambda$ is the wavelength of interest. By having multiple layers, mirrors can be manufactured which can transmit and reflect light in different wavelength regions subject to certain restrictions; the mirrors are limited in the degree of sharpness of the cutoff, that is, it is very difficult to have of the order of 100% reflection at wavelength, $\lambda_1$, and also have of the order of 100% transmittance at wavelength, $\lambda_2$, such that $\lambda_1 = \lambda_2 \pm 20$ nm, approximately. In the particular case of triply ionised ytterbium ions doped in silica-based glass to operate at a wavelength centred around 1017 nm (corresponding to the peak of the $^1G_4$ absorption band of triply ionised praseodymium doped optical glass fibre such as is suitable for an amplifier in the 1300 nm region), it is necessary to provide mirrors with a high degree of transmission at around 1033 nm and a high degree of reflectance at around 1017 nm. Further, if a pump wavelength of ~974 nm corresponding to the peak of the absorption of triply ionised ytterbium doped in glass is used to excite the ytterbium ions, then the mirror should have a high degree of transmittance at the pump wavelength. In either case, that is whether the particular pump wavelength corresponding to the absorption peak of the triply ionised ytterbium ions is used or not, the discrimination that is required to obtain laser operation in the desired wavelength range is such that dielectric mirrors cannot be easily manufactured and if dielectric mirrors are used which do not correspond to the reflection and transmission characteristics as outlined above, then the operation of the laser will be less efficient.

The discrimination that is necessary to cause laser operation at the desired laser wavelength, which is difficult to provide with dielectric mirrors, is provided in the invention by Bragg gratings of the appropriate reflectance profile.

BRIEF DESCRIPTION OF THE DRAWINGS

The invention may be more fully appreciated by reference to the detailed description of the preferred embodiment in conjunction with the drawings in which:

FIG. 1 is a diagrammatic view of a preferred embodiment of the invention;

FIG. 2 is a typical absorption spectrum of triply ionised ytterbium doped in glass;

FIG. 3 is a cross sectional view of a double clad optical fibre; and,

FIG. 4 is a typical emission spectrum of triply ionised ytterbium doped in glass.

DETAILED DESCRIPTION OF THE INVENTION

Referring to FIG. 1, there is provided a semiconductor laser diode 10, a focusing system 12, and optical fibre 14. The output of the overall device may consist of a beam of laser light 16, (at a wavelength of 1017 nm for example), as suggested by FIG. 1, but the fibre may also be directly connected to another optical fibre. The focusing system of the preferred embodiment consists of a collection lens, which collects the laser light emitted from the laser diode, in association with a focusing lens, which collects the laser beam after it has passed through the first lens and launches the pump laser light into the optical fibre. The arrangement of the collection and focussing lenses is well known to those skilled in the art.

The laser diode 10 emits at a wavelength within the absorption band of triply ionised ytterbium in glass which occurs from 800 to 1070 nm as illustrated in FIG. 2. Ideally, the emission of the laser diode should correspond to one of the two maxima of absorption in the said absorption band of triply ionised ytterbium in glass, with one maximum (the strongest absorption) occurring within a few nanometres around 974 nm, as noted by the numeral labelled 18 in FIG. 2, and the other maximum occurring in a wavelength range of around 900 to 910 nm, as noted by the numeral 20 in FIG. 2.

FIG. 3 illustrates a double clad structure of optical fibre suitable for use in the invention. The optical fibre is a silica-based glass-based optical fibre structure comprising a core 22 of circular cross section doped with triply ionised ytterbium ions. It may also be doped with other materials, for example germanium or cerium or tantalum, such that the fibre is photosensitive, enabling the writing of fibre Bragg gratings in or near the core, as will be discussed below. The core should have dimensions such that any laser signals resulting from said ytterbium ions would be guided in a single mode ($LP_{01}$). For example, if a core and the surrounding inner cladding 24 had a refractive index difference of 0.0095, that is the numerical aperture of the core is approximately 0.17, for a signal single mode cutoff of 1000 nm, that is at a wavelength of 1000 nm the normalised frequency or V-number should equal 2.405, then the radius of the core would be approximately $2.25 \times 10^{-6}$ m. The inner cladding 24 has a refractive index which is less than the refractive index of the core such that light of the signal or laser wavelength would be guided in the core. The inner cladding need not, but may, be doped with materials such that the inner cladding would also be photosensitive. Although the inner cladding 24 is illustrated in FIG. 3 as having a circular cross section, other geometrical designs, such as for example rectangular, may be used. The inner cladding 24 is surrounded by a second, outer cladding 26 having a refractive index lower than that of the inner cladding 24 such that pump light of an appropriate wavelength would be guided in the inner cladding 24. The dimensions of the inner cladding 24 should be such that the structure would be able to support more than one guided mode at the pump wavelength, that is the inner cladding is multi-mode at the pump wavelength. For example, a typical inner cladding diameter might be 100 μm as required to achieve sufficient coupling of pump light into the first cladding.

A typical emission spectrum of triply ionised ytterbium doped in a silica-based optical fibre is illustrated in FIG. 4.

The emission peak corresponding to the region of maximum emission has been labelled 28 and occurs at a wavelength of approximately 974 nm. The next highest emission peak, occurring at around a wavelength of 1033 nm has been labelled 30. The wavelength region which corresponds to the peak of the $^3H_4 \rightarrow {}^1G_4$ absorption band of triply ionised praseodymium doped optical glass fibre occurs between the emission peaks of 28 and 30 and has been labelled 32. That wavelength is from about 1012 to 1022 nm. If broadband reflectors were used to form a laser cavity, laser action would occur at either of the emission peaks, 28 or 30, depending on what wavelength of pump laser is used as a pump source and on whether the laser resonator cavity is set up such that three level laser operation occurs (at emission peak 28) or quasi-four level laser operation occurs (at emission peak 30). If a pump wavelength corresponding to the strongest absorption, say within 4 nm of 974 nm, is used, then laser operation will only occur as quasi-four level (at emission peak 30). Alternatively, if a pump wavelength which corresponds to the second strongest absorption is used, say in the range of 895 to 915 nm, then laser operation can also occur at the emission peak 28 as well as possibly at emission peak 30, depending on the laser resonator cavity.

To achieve efficient, high power laser action in the region of wavelength 32, sufficient optical discrimination must be provided to prevent laser action either at emission peak 28 or peak 30. To prevent laser operation occuring at a wavelength corresponding to peak 28, the laser resonator cavity can be arranged such that there is a high loss at this wavelength due the three level nature of the laser. That is, the length of the fibre must be sufficient such that re-absorption at the wavelength of peak 28 has a significant effect in that it will prevent lasing occurring at this emission peak. The correct optical length considers the length of fibre taking into account the dopant concentration, and core size. The length of a sufficiently long fibre may be determined by the particular characteristics of the fibre core such as dopant concentration and the initial pump power available. For example, for a fibre of area of core to area of inner cladding ratio of 376, with a dopant concentration of ytterbium ions of 10,000 ppm, with a pump wavelength of 910 nm of which some three watts is launched into the inner cladding. With feedback for all wavelengths provided by the fresnel reflections from the bare cleaved fibre ends, it is necessary to have a fibre length greater than 0.06 m to provide sufficient reabsorption in the doped fibre that laser emission at the wavelength peak 28 is avoided and laser emission occurs at a different wavelength.

Discrimination of emission peak 30 may not be provided for in the same manner as emission peak 28 so that another method is used. As the difference between the emission peak 30 and the wavelength region where laser operation is desired (between 1012 and 1022 nm, labelled 32) is less than 40 nm, it is very difficult to provide dielectric mirrors with a high degree of transmission (greater than 85%) at emission peak 30 and a high degree of reflectance at 1012–1022 nm. Optical discrimination is therefore provided by the use of optical fibre Bragg gratings written in or near the core. A first grating 34 cooperates with a second grating 36 to form a resonator cavity. Fibre Bragg grating 34 is formed in the laser diode end of the fibre and has a wavelength of reflection corresponding to the peak of the $^3H_4 \rightarrow {}^1G_4$ absorption band of triply ionised praseodymium doped optical glass fibre, namely in the range 1012 to 1022 nm. The reflectivity of fibre Bragg grating 34 should be approximately 100% or as close to 100% as is possible given the state of fibre Bragg grating technology. Fibre Bragg grating 36 is formed at the output end of the fibre and has a wavelength of reflection which is substantially similar as the Bragg grating 34. However, fibre Bragg grating 36 has a reflectivity less than that of fibre Bragg grating 34 such that power may be removed from the resonant cavity as useful output power. The fibre Bragg gratings need not be formed strictly at or near the laser diode end and the output end of the optical fibre, but may be written in any longitudinally spaced relationship so as to form an optical resonant cavity within the fibre. The Bragg gratings should also provide a sufficient amount of reflection at a particular wavelength such that the optical gain generated in the fibre by the triply ionised ytterbium ions at the wavelength of the reflection from said Bragg gratings would become equal to the optical loss at that wavelength before the optical gain at any other wavelength of emission from triply ionised ytterbium ions becomes equal to the optical loss at that other wavelength. Hence laser action will occur at the wavelength of the reflection of the Bragg gratings and not at any other wavelength. For example, for a fibre length of 3.5 m, with a ytterbium dopant concentration of 500 ppm and an area of core to area of cladding ratio of 10, with a pump wavelength of 974 nm, to ensure that lasing occurred at 1017 nm corresponding to the peak of the praseodymium absorption, a grating of reflectivity, $R_1$, and a grating of reflectivity, $R_2$, where $0<R_1,R_2<1$, would require that $R_1R_2>0.2$ given that the only feedback for any other possible laser wavelengths would be due to the fresnel reflections (of the order of 4%) from the cleaved endfaces of the fibre. In this particular example, given a fibre background loss of 0.04 dBm$^{-1}$, then the maximum possible slope efficiency, which is the ratio of useful output power at the laser wavelength to the difference between the total power absorbed in the fibre and the power absorbed in the fibre to reach the threshold of laser operation, for $R_1=1$ (that is, 100% reflecting) and $R_2=0.2$ (that is, 20% reflecting) is 90%.

It should now be apparent that the present invention provides a highly efficient means of producing high power laser light output at a wavelength corresponding to the peak of the $^3H_4 \rightarrow {}^1G_4$ absorption band of triply ionised praseodymium doped optical glass fibre such as is suitable for an amplifier of light in the 1.3 μm wavelength range It will also be appreciated that variations to the preferred embodiment may be practised without departing from the scope of the invention.

What is claimed is:

1. An optical fibre laser pump source for Pr fibre amplifiers in the 1300 nm region comprising:

a semiconductor laser source for providing a first light output, said laser source having a wavelength emission within the wavelength band of about 800 nm to 1070 nm;

a Yb$^{3+}$ fibre laser comprising a double clad fibre having a pumped core and inner pump cladding, said core doped with a Yb ions;

first coupling means for optically launching said first output into said inner pump cladding;

said Yb$^{3+}$ fibre laser having dominate emission spectra with first and second dominate emission peaks respectively at about 974 nm and 1033 nm;

a pair of fibre gratings formed in said double clad fibre in spaced relation forming an optical resonator cavity;

said fibre laser having a sufficient fibre length to provide reabsorption in the doped core sufficient to optically discriminate against laser emission at said first dominate emission peak of said Yb$^{3+}$ fibre laser;

said gratings both having a peak wavelength corresponding to the peak of the absorption band of $Pr^{3+}$ within the wavelength band of 1012 nm to 1022 nm to optically discriminate against laser emission at said second dominate emission peak of said $Yb^{3+}$ fibre laser;

the combination of both optical discriminations against said first and second dominate emission peaks of said $Yb^{3+}$ fibre laser forcing stable laser emission at an operational wavelength between 1012 nm to 1022 nm within the absorption band of $Pr^{3+}$;

one of said fibre gratings approximate to said semiconductor laser source having a maximum reflectivity, $R_1$ at said operational wavelength and the other of said fibre gratings having a reflectivity, $R_2$ at said operational wavelength less than maximum reflectivity to provide a second light output; and second coupling means for optically launching said second output into a fibre amplifier with a core doped $Pr^{3+}$.

2. The optical fibre laser pump source of claim 1 wherein the laser wavelength of said semiconductor laser source is within 4 nm of a peak wavelength of 974 nm.

3. The optical fibre laser pump source of claim 1 wherein reflectivity, $R_1$ of said one grating and reflectivity, $R_2$ of said other grating are selected so that $R_1 R_2 > 0.2$ where $0 < R_1, R_2 < 1$.

* * * * *